United States Patent [19]
Dell

[11] Patent Number: 4,588,187
[45] Date of Patent: May 13, 1986

[54] PORT EXPANSION ADAPTER FOR VIDEO GAME PORT

[75] Inventor: George H. Dell, Morton Grove, Ill.

[73] Assignee: Wico Corporation, Niles, Ill.

[21] Appl. No.: 625,102

[22] Filed: Jun. 27, 1984

[51] Int. Cl.$^4$ .............................................. A63B 67/00
[52] U.S. Cl. .................................. 273/1 E; 273/148 B; 273/DIG. 28; 307/115
[58] Field of Search ...................... 307/38, 40, 41, 113, 307/115; 364/410, 188, 190; 273/148 B, 85 G, DIG. 28, 1 E; 361/191–193; 340/825.03, 825.04, 706, 709

[56] References Cited

U.S. PATENT DOCUMENTS

| | | | |
|---|---|---|---|
| 3,368,200 | 2/1968 | McNicol | 361/193 X |
| 4,353,552 | 10/1982 | Pepper, Jr. | 273/DIG. 28 X |
| 4,381,456 | 4/1983 | Saito et al. | 307/115 X |
| 4,501,424 | 2/1985 | Stone et al. | 273/148 B |

OTHER PUBLICATIONS

Radio Shack 1984 Catalog, p. 178 and Radio Shack's TRS-80 Multi-Pak Interface Owners Manual.

*Primary Examiner*—A. D. Pellinen
*Assistant Examiner*—Derek S. Jennings
*Attorney, Agent, or Firm*—Emrich & Dithmar

[57] ABSTRACT

A game port expander for a video game input port includes a plurality of first multi-pin ports respectively connectable to four different game controllers, and a second multi-pin port connectable to the input port of a video game. Each game controller has a "fire control" switch which is connected to a selected pin of the corresponding first port for applying a signal to that port when the switch is actuated. That signal is converted by a decimal-to-binary converter to a binary representation of that first port which is applied to the inputs of a two-bit IC latch. The switch signal is also applied through an OR gate to an RC timing circuit which activates the latch after the signal is present for a predetermined time, to actuate an IC switching circuit which provides an interconnection between predetermined terminals of the second port and the corresponding terminals of the selected one first port.

19 Claims, 3 Drawing Figures

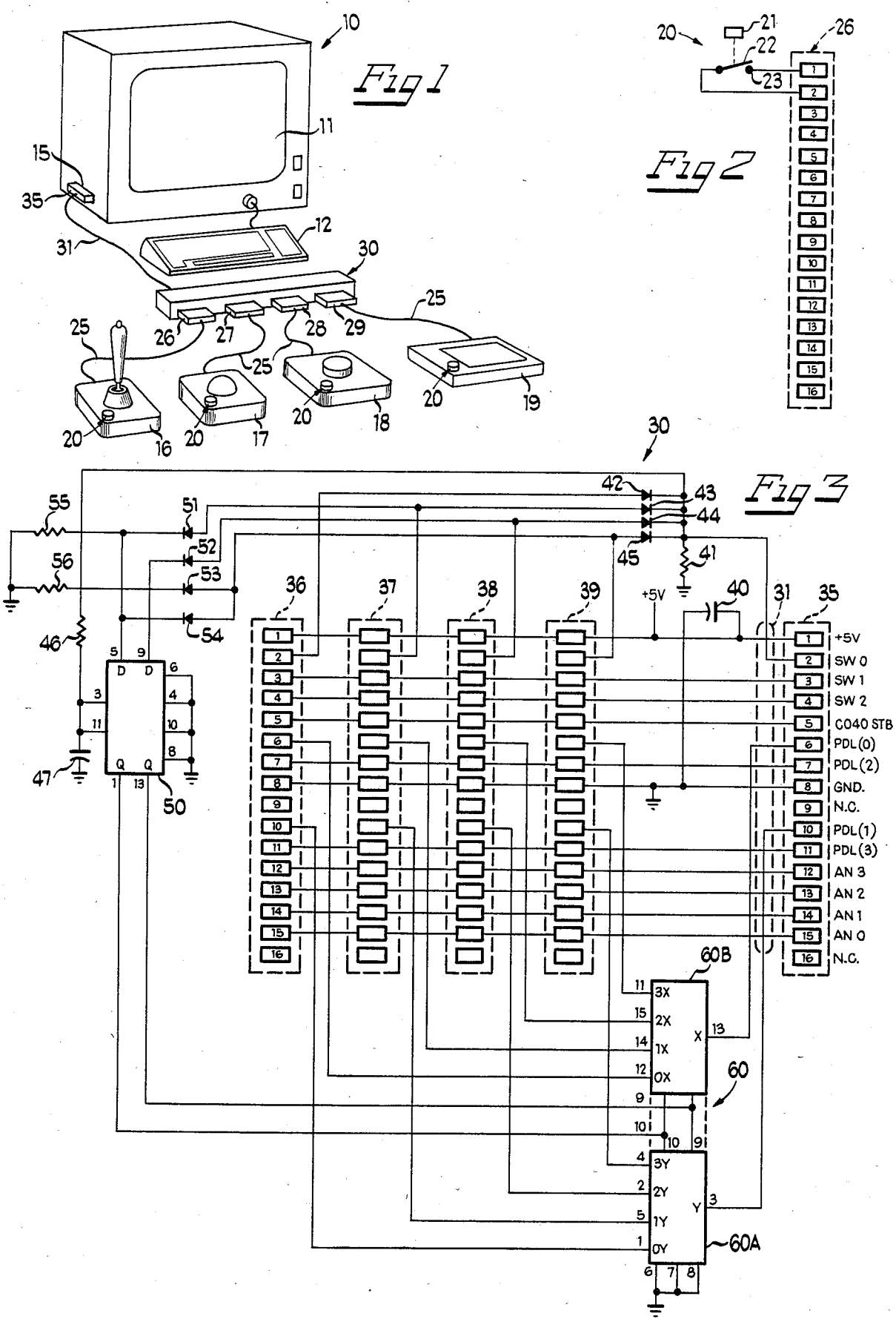

PORT EXPANSION ADAPTER FOR VIDEO GAME PORT

BACKGROUND OF THE INVENTION

The present invention relates to adapter circuits for providing an interface between an input port and a plurality of input devices. The adapter circuit has particular application to the input ports of video games.

In the typical video game there is provided a video monitor, which may be a computer terminal or a television set, for example. A program unit, which may be built into a computer or provided in a separate housing, contains the game software for generating the video display and a cursor or "blip" which moves about the display. There are also provided one or more controllers usable by the player or players for controlling movement of the cursor on the video screen. The controller is adapted to be plugged into the computer or separately housed program unit. There are typically accommodations for two identical controllers so that a game can be played by two competing players at a time.

Commonly, each computer or program unit is adapted for use with a number of different game programs. Different types of controllers have been designed for use with different types of game programs, since the nature and speed of cursor movement required can differ considerably from game to game. Thus, for example, there have been developed "paddle"-type controllers, which utilize a rotating knob for a one-dimensional control of cursor direction; joystick-type controllers which utilize a joystick for two-dimensional control of cursor direction; trackball-type controllers which utilize a universally rotating ball for two dimensional control of both speed and direction of cursor movement; and touch tablet controllers which respond to movement of the user's finger over a tablet representative of the video screen to produce a corresponding cursor movement.

To realize the full potential of a video game system, the user should have a pair of each of these types of controllers. But this necessitates that the controllers must be repeatedly connected and disconnected each time a different type of controller is needed. There have been provided port expansion adapters which are connected to the video game input port and to each of the several different types of controllers to obviate connection and disconnection of the controllers. In such adapters, when a particular type of controller is to be used, a selective operation must be performed to render the selected controller operative for controlling the game. This selection operation may take the form of typing in on a keyboard information identifying the selected controller, or activating selector switches or the like. Such units are inconvenient in that they require the user to remember the proper selection operation sequence for each type of controller. Thus such adapters are susceptible to erroneous connections, wherein the player attempts to enable one controller and in fact enables another.

SUMMARY OF THE INVENTION

It is a general object of the present invention to provide an improved type of port expansion adapter which avoids the disadvantages of prior adapters while affording additional structural and operating advantages.

It is a fundamental object of the invention to provide an adapter of the type set forth, wherein the input device or controller to be used is self-selecting.

In connection with the foregoing object, it is another object of this invention to provide an adapter of the type set forth which responds to a signal originated from the selected input device or controller for enabling that controller.

In connection with the foregoing objects, it is another object of the invention to provide an adapter of the type set forth, which is of simple and economical construction.

Yet another object of the invention is the provision of an adapter of the type set forth, which requires only a momentary action by the user to enable the selected input device, yet avoids response to spurious signals.

These and other objects of the invention are attained by providing an adapter circuit comprising a plurality of first ports and a second port, switching means connected to each of the first ports and to the second port, and control means connected to each of the first ports and to the switching means, the control means being responsive to a signal at any one of the first ports for causing the switching means to establish a connection between the one first port and the second port.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a video game system connectable to a plurality of video game controllers through a port expansion adapter constructed in accordance with and embodying the features of the present invention;

FIG. 2 is a fragmentary schematic circuit diagram of the "fire control" switch of a game controller; and FIG. 3 is a schematic circuit diagram of the port expansion adapter of the present invention.

DESCRIPTION OF THE PREFERRED EMBODIMENT

Referring to FIG. 1, there is illustrated a video monitor, generally designated by the numeral 10, which may be in the form of a computer terminal having a display screen 11, as illustrated, or a television set. The video game is typically provided with a game program unit which may be built into the computer terminal or may be separately housed and adapted for connection to the video monitor 10. In the case of a computer terminal, there may also be provided a keyboard 12. The program unit is provided with at least one, and preferably two input ports 15 (one shown), to each of which an associated controller may be connected for controlling the operation of the video game. Two such input ports 15 permit games to be played by two competing players.

Preferably, each input port 15 is a multi-terminal receptacle, such as a 16-pin receptacle. It will be understood that the program unit can accommodate any of a number of different game programe, which may be stored in the computer RAM or on tape cartridges, for playing a number of different types of video games, which may require the use of different types of controllers. By way of example, there are illustrated in FIG. 1 a joystick controller 16, a trackball controller 17, a paddle controller 18 and a touch tablet controller 19, all of known construction. Each of these controllers is of a type which incorporates a separate function control switch 20, which may be a "fire control" switch. In the operation of such a controller, the main direction control device, such as the joystick, trackball or the like, is utilized to control the direction only or the direction and speed of movement of the cursor on the display screen 11. Typically, the cursor may represent a vehicle of some type which includes a weapon, and the "fire control" button is utilized to "fire" the weapon.

Referring to FIG. 2, the control switch 20 is preferably of the push button type, having a push button 21 mechanically coupled to a movable contact 22 with is movable into and out of engagement with a fixed contact 23 for closing and opening the switch 20, all in a known manner.

Each of the controllers 16-19 is provided with a cable 25. The cables 25 for the several controllers respectively terminate in 16-pin plugs 26, 27, 28 and 29, each adapted to be plugged into one of the input ports 15. It will be appreciated that in the case of games for two players, two of each of the four different types of controllers 16-19 would be provided.

Referring now also to FIG. 3 of the drawings, here is illustrated the schematic circuit diagram of the port expansion adapter, generally designated by the numeral 30, constructed in accordance with and embodying the features of the present invention. The port expansion adapter 30 includes a cable 31 which terminates at an output port 35 in the form of a 16-pin plug, which is adapted to be plugged into one of the input ports 15 of the video game or the video monitor 10. The port expansion adapter 30 is also provided with four input ports 36, 37, 38 and 39, each in the form of a 16-pin socket or receptacle, adaptable for receiving the plugs 26-29 of the controllers 16-19. Thus, it will be appreciated that all four of the controllers 16-19 may simultaneously be plugged into the port expansion adapter 30.

As can be seen in FIG. 3, pins 1, 3-5, 7, 8 and 11-15 of the port 35 are respectively connected to the corresponding pins of the ports 36-39, while pins 9 and 16 of the ports are not connected in the disclosed embodiment. This embodiment is specifically designed for use with a computer of the type sold by Apple Computer Company under the trademark "APPLE II", for purposes of illustration, but it will be appreciated that the present invention could be used with other types of video game arrangements. Pin 1 is connected to a +5 volt DC supply and pin 8 is connected to ground. A low pass filter capacitor 40 is connected between the +5 volt supply and ground. Connected between pin 2 of the port 35 and ground is a resistor 41. Also connected to pin 2 of the port 35 are the cathodes of four diodes 42, 43, 44 and 45, the anodes of which are respectively connected to the pin 2 terminals of the ports 36-39.

The cathodes of the diodes 42-45 are also connected to one terminal of a resistor 46, the other terminal of which is connected to the anode of a capacitor 47, the cathode of which is connected to ground. The anode of the capacitor 47 is also connected to the clock input terminals, designated 3 and 11, of a latch circuit 50.

The latch circuit 50 is a two-bit latch, which is preferably a 4013 integrated circuit. The latch circuit 50 has two data input terminals, designated 5 and 9. Connected to the data input terminals is a decimal-to-binary converter comprising four diodes 51, 52, 53 and 54. The anodes of the diodes 51 and 52 are respectively connected to the pin 2 terminals of the ports 37 and 38, while the anodes of the diodes 53 and 54 are both connected to the pin 2 terminal of the port 39. The cathodes of the diodes 51 and 54 are connected to the data input terminal 5 of the latch circuit 50, and are also connected to ground through a resistor 55. The cathode of the diode 52 is connected to the data input terminal 9 of the latch circuit 50 and the cathode of the diode 53 is connected to ground through a resistor 56.

The output terminals, designated 1 and 13, of the latch circuit 50 are respectively connected to the input terminals, designated 9 and 10, of a switching circuit 60, which is preferably a 4052 integrated circuit. The switching circuit 60 is divided into two halves 60A and 60B, having common input terminals. The switching circuit 60 has two output terminals, designated 3 and 13, respectively connected to pins 10 and 6 of the port 35, and eight input terminals, designated 1, 2, 4 and 5 on section 60A and 11, 12, 14 and 15 on section 60B. The input terminals on section 60A of the switching circuit 60 are respectively connected to the pin 10 terminals of the ports 36-39, while the input terminals on the section 60B are respectively connected to the pin 6 terminals of the ports 36-39.

In operation, the plugs 26-29 of the controllers 16-19 are respectively plugged into the receptacles of ports 36-39 of the port expansion adapter 30. The plug of port 35 is plugged into one of the input ports 15 of the program unit. While only one of the port expansion adapters 30 is illustrated, it will be appreciated that normally two will be provided, one for each of the two input ports 15. When the parts are thus connected, it will be noted that the terminals of the control switch 20 in each of the controllers 16-19 will be connected across the terminals 1 and 2 of the corresponding one of the ports 36-39, pin 1 being connected to the DC supply.

When the player wishes to utilize one of the controllers 16-19 for playing a particular video game, he simply closes the control switch 20 of that controller, thereby applying a +5 VDC signal to pin 2 of the corresponding one of the ports 36-39. That signal is in turn applied to the corresponding one of the diodes 42-45, which act as an OR gate. The output of the OR gate is applied to pin 2 of the port 35, and also begins to charge the capacitor 47 through the resistor 46. Simultaneously, a binary number is applied to the data input terminals 5 and 9 of the latch circuit 50. This binary number represents that one of the controllers 16-19, the control switch 20 of which was just actuated. In this regard, it will be noted that the outputs at pins 2 of the ports 36-39 are essentially decimal, i.e., there is one line for each port. But the connection of the diodes 51-54 is such that they operate as a decimal-to-binary converter. Thus, for example, if the ports 36-39 are respectively designated by the decimal numerals "0", "1", "2" and "3", it will be appreciated that if the controller connected to the port 37 is selected, the output of the diode 51 will be high and the outputs of the diodes 52-54 will all be low, resulting in a binary "1, 0" being applied to the data input terminals 5 and 9 of the latch circuit 50.

When the voltage across the capacitor 47 reaches the predetermined threshold voltage of the clock inputs of the latch circuit 50, the binary number at the data inputs will be latched and it will be applied to the input terminals 9 and 10 of the switching circuit 60. The output terminals of the two sections 60A and 60B of the switching circuit 60 which respectively correspond to the decimal numbers "0"–"3" are appropriately labeled in FIG. 3. Thus, for example, in the case where the controller connected to port 37 has been selected, the binary "1, 0" number at the input terminals of the switching circuit 60 will cause a connection to be established between terminals 3 and 5 of section 60A, for interconnecting pin 10 of the port 37 with pin 10 of the port 35, and will cause a connection to be established between terminals 14 and 13 of section 60B, for interconnecting pin 6 of the port 37 with pin 6 of the port 35. Preferably, the terminals 6 and 10 will respectively be connected to the horizontal and vertical inputs of the video monitor 10.

The time constant of the RC circuit established by the resistor 46 and the capacitor 47 is set to accommodate date contact bounce on closure of the control switch 20. This prevents the latch circuit 50 from responding until the contacts have settled to avoid latching of the circuit 50 during a momentary interruption of the binary signals at the data input terminals 5 and 9. This time constant may, for example, be on the order of several milliseconds. Once the latch circuit 50 is actuated the switching circuit 60 will remain operated for establishing the connection between the corresponding pins of the output port 35 and the selected one of the input ports 36–39, even after the control switch 20 has been released. Thus, only a brief actuation of the control switch 20 by the user is necessary. The threshold voltage of the clock input terminals of the latch circuit 50 is set to insure that the circuit will not latch until the clock inputs are high, thereby to prevent latching in response to noise or other spurious signals.

While the present invention has been described in connection with a video game, it will be appreciated that it could be used in other applications. For example, the invention could be used as a pointing device selector for business oriented software such as word processing and spread sheet programs, or as an input device selector for CAD/CAM design stations.

From the foregoing, it can be seen that there has been provided an improved port expansion adapter which is of simple and economical construction and which permits enablement of a selected input device by a signal from that input device, thereby to provide error-free self-enablement of the selected input device.

I claim:

1. An adapter circuit comprising a plurality of first ports and a second port, switching means connected to each of said first ports and to said second port, and control means connected to each of said first ports and to said switching means, said control means being responsive to a signal at any one of said first ports for causing said switching means to establish a connection between said one first port and said second port.

2. The adapter circuit of claim 1, wherein said control means includes latch means for holding said switching means in an operated condition for maintaining said connection between said one first port and said second port after termination of said signal.

3. The adapter circuit of claim 2, wherein said control means further includes timing means for preventing operation of said latch means until said signal has been present at said one first port for a predetermined time period.

4. The adapter circuit of claim 1, wherein each of said first and second ports includes a like plurality of terminals, said control means being connected to a first terminal of each of said first ports, said switching means being connected to second terminals of each of said ports.

5. The adapter circuit of claim 4, and further including connector means permanently connecting third ones of said terminals of said second port to the corresponding terminals of all of said first ports.

6. An adapter circuit comprising a plurality of first ports and a second port, switching means connected to each of said first ports and to said second port, and control means connected to each of said frst ports and to said switching means, said control means including encoding means responsive to a signal at any one of said first ports for producing a coded selection signal representative of said one first port and for applying said selection signal to said switching means, said switching means including decoding means responsive to said selection signal for establishing a connection between said one first port and said second port.

7. The adapter circuit of claim 6, wherein said encoding means includes means for producing a binary coded representation of each of said first ports.

8. The adapter circuit of claim 7, wherein said encoding means includes decimal to binary conversion means.

9. The adapter circuit of claim 8, wherein said switching means includes binary to decimal conversion means.

10. The adapter circuit of claim 6, wherein said encoding means includes latch means for holding said switching means in an operated condition for maintaining said connection between said one first port and said second port after removal of said signal, and timing means for preventing operation of said latch means until said signal has been present at said one of said first ports for a predetermined time period.

11. The adapter circuit of claim 10, wherein each of said switching means and said latch means comprises an integrated circuit.

12. A port expansion adapter for selectively connecting any one of a plurality of input devices to an input port wherein each of said input devices includes a switch, said adapter comprising: a plurality of first ports adapted to be respectively connected to the input devices, a second port adapted to be connected to the input port, means responsive to closure of the switch of one of the connected input devices for producing a control signal at the corresponding one of said first ports, switching means connected to each of said first ports and to said second port, and control means connected to each of said first ports and to said switching means, said control means being responsive to a control signal at one of said first ports for causing said switching means to establish a connection between said one first port and said second port, thereby to establish a connection between said input port and the input device connected to said one first port.

13. The port expansion adapter of claim 12, wherein each of said input devices is a different type of video game controller.

14. The port expansion adapter of claim 13, wherein said switch comprises a function control switch on each of said video game controllers.

15. The port expansion adapter of claim 12, and further including means connected to each of said first and second ports for transmitting a supply voltage to the switches of the input devices.

16. The port expansion adapter of claim 12, wherein each of said first and second ports includes a like plurality of terminals, said control means being connected to a first terminal of each of said first ports, said switching means being connected to second terminals of each of said ports.

17. The port expansion adapter of claim 16, and further including connector means permanently connecting third ones of said terminals of said second port to the corresponding terminals of all of said first ports.

18. The port expansion adapter of claim 12, wherein said control means includes latch means for holding said switching means in an operated condition for maintaining said connection between said one first port and said second port after termination of said control signal.

19. The port expansion adapter of claim 18, wherein said control means further includes timing means for preventing operation of said latch means until said control signal has been present at said one first port for a predetermined time period.

* * * * *